US010330347B2

(12) United States Patent
Yang

(10) Patent No.: US 10,330,347 B2
(45) Date of Patent: Jun. 25, 2019

(54) POSITIONING FOOT BLOCK

(71) Applicant: JING-XIN SOLAR LTD., Tainan (TW)

(72) Inventor: Ching-Lung Yang, Tainan (TW)

(73) Assignee: Jing-Xin Solar Ltd., Tainan (TW)

( * ) Notice: Subject to any disclaimer, the term of this patent is extended or adjusted under 35 U.S.C. 154(b) by 0 days.

(21) Appl. No.: 15/697,864

(22) Filed: Sep. 7, 2017

(65) Prior Publication Data
US 2018/0100673 A1    Apr. 12, 2018

(30) Foreign Application Priority Data

Oct. 7, 2016 (TW) .............................. 105215309 U
Oct. 13, 2016 (TW) ............................. 105215546 U

(51) Int. Cl.
| | |
|---|---|
| *H02S 20/00* | (2014.01) |
| *F24S 25/615* | (2018.01) |
| *H02S 20/23* | (2014.01) |
| *H02S 20/30* | (2014.01) |
| *F24S 25/63* | (2018.01) |
| *F24S 25/60* | (2018.01) |

(52) U.S. Cl.
CPC ............. *F24S 25/615* (2018.05); *F24S 25/63* (2018.05); *H02S 20/23* (2014.12); *H02S 20/30* (2014.12); *F24S 2025/6005* (2018.05); *F24S 2025/6006* (2018.05); *Y02B 10/12* (2013.01); *Y02E 10/47* (2013.01)

(58) Field of Classification Search
CPC ............... F24J 2/5249; F24J 2002/4667; F24J 2002/4669; H02S 20/23; H02S 20/30
USPC .......................................................... 52/173.3
See application file for complete search history.

(56) References Cited

U.S. PATENT DOCUMENTS

| | | | | |
|---|---|---|---|---|
| 4,199,908 | A * | 4/1980 | Teeters ................ | E04H 12/2284 248/357 |
| 4,923,165 | A * | 5/1990 | Cockman ................ | E02D 5/801 248/156 |
| 9,608,559 | B2 * | 3/2017 | Haddock .................. | H02S 20/23 |
| 9,631,392 | B2 * | 4/2017 | Bergman ............. | E04H 12/2223 |
| 2011/0272545 | A1 * | 11/2011 | Liu .......................... | E04D 13/12 248/222.14 |
| 2012/0244729 | A1 * | 9/2012 | Rivera .................... | F24J 2/4638 439/97 |
| 2014/0003861 | A1 * | 1/2014 | Cheung .................. | F24J 2/5256 403/291 |
| 2016/0025262 | A1 * | 1/2016 | Stearns ................. | E04D 13/076 248/70 |

* cited by examiner

*Primary Examiner* — Charles A Fox
*Assistant Examiner* — James J Buckle, Jr.
(74) *Attorney, Agent, or Firm* — Muncy, Giessler, Olds & Lowe, P.C.

(57) ABSTRACT

A positioning foot block for the mounting of an upright bar is disclosed to include a support device having a bottom wall, two side walls respectively extended from opposing left and right sides of the bottom wall and a positioning space surrounded by the bottom wall and the side walls for receiving the upright bar. Each side wall of the support device has two side lugs respectively extended from opposing front and rear sides thereof toward the positioning space and respectively clamped on respective corner ends of the upright bar. Thus, the structural design of the positioning foot block can clamp the corner ends of the upright bar firmly, prohibiting the upright bar from vibration and enhancing its positioning stability.

4 Claims, 9 Drawing Sheets

POSITIONING FOOT BLOCK

BACKGROUND OF THE INVENTION

1. Field of the Invention

The present invention relates to positioning foot blocks and more particularly, to a positioning foot block for supporting a solar panel.

2. Description of the Related Art

In recent years, in order to effectively reduce the dependence on petrochemical energy and improve the environmental pollution caused by petrochemical energy, green alternative energy technology is constantly evolving to make a breakthrough. One of the most widely used green alternative energies is solar power.

Generally, solar panels are mounted above the roof with brackets. A bracket for this purpose generally comprises a plurality of upright bars, and a plurality of positioning foot blocks mounted between the upright bars and the roof.

However, with the development of solar energy industry, the weight and surface area of one single piece of solar panel have been gradually increased, relatively, the positioning foot blocks must be designed to be more solid to firmly support the solar panels.

SUMMARY OF THE INVENTION

The present invention has been accomplished under the circumstances in view. It is the main object of the present invention to provide a positioning foot block for purchase or use by a user, which enhances positioning stability and allows angular adjustment of the supported member.

To achieve this and other objects of the present invention, a positioning foot block is adapted for the mounting of for holding an upright bar comprising a plurality of spaced corner ends in the cross section. The positioning foot block comprises a support device. The support device comprises a bottom wall, two side walls respectively extended from opposing left and right sides of the bottom wall and a positioning space surrounded by the bottom wall and the side walls for receiving the upright bar. Each side wall of the support device comprises two side lugs respectively extended from opposing front and rear sides thereof toward the positioning space and respectively clamped on the respective corner ends of the upright bar. Thus, the structural design of the positioning foot block can clamp the corner ends of the upright bar firmly, prohibiting the upright bar from vibration and enhancing its positioning stability.

Preferably, the bottom wall and the side walls are integrally made in one piece. Each side wall comprises a main body portion upwardly extended from the bottom wall. The side lugs are respectively perpendicularly extended from opposing front and rear sides of the main body portion toward the positioning space.

Preferably, the support device further comprises an abutment wall for abutment against the upright bar in left-right direction, two side lugs respectively extended from opposing front and rear sides of the abutment wall toward the upright bar and respectively clamped on opposing front and rear sides of the upright bar, and a lateral screw for fastening the attachment and the upright bar between the side walls in a biasable manner. The side walls are movable relative to the bottom wall between a loosened status where the side walls are loosely clamped on the abutment wall and the upright bar for allowing the upright bar to be turned about the lateral screw and a tightening up status where the side walls are tightly clamped on the abutment wall and the upright bar.

Other advantages and features of the present invention will be fully understood by reference to the following specification in conjunction with the accompanying drawings, in which like reference signs denote like components of structure.

DETAILED DESCRIPTION OF THE INVENTION

Figure 1:
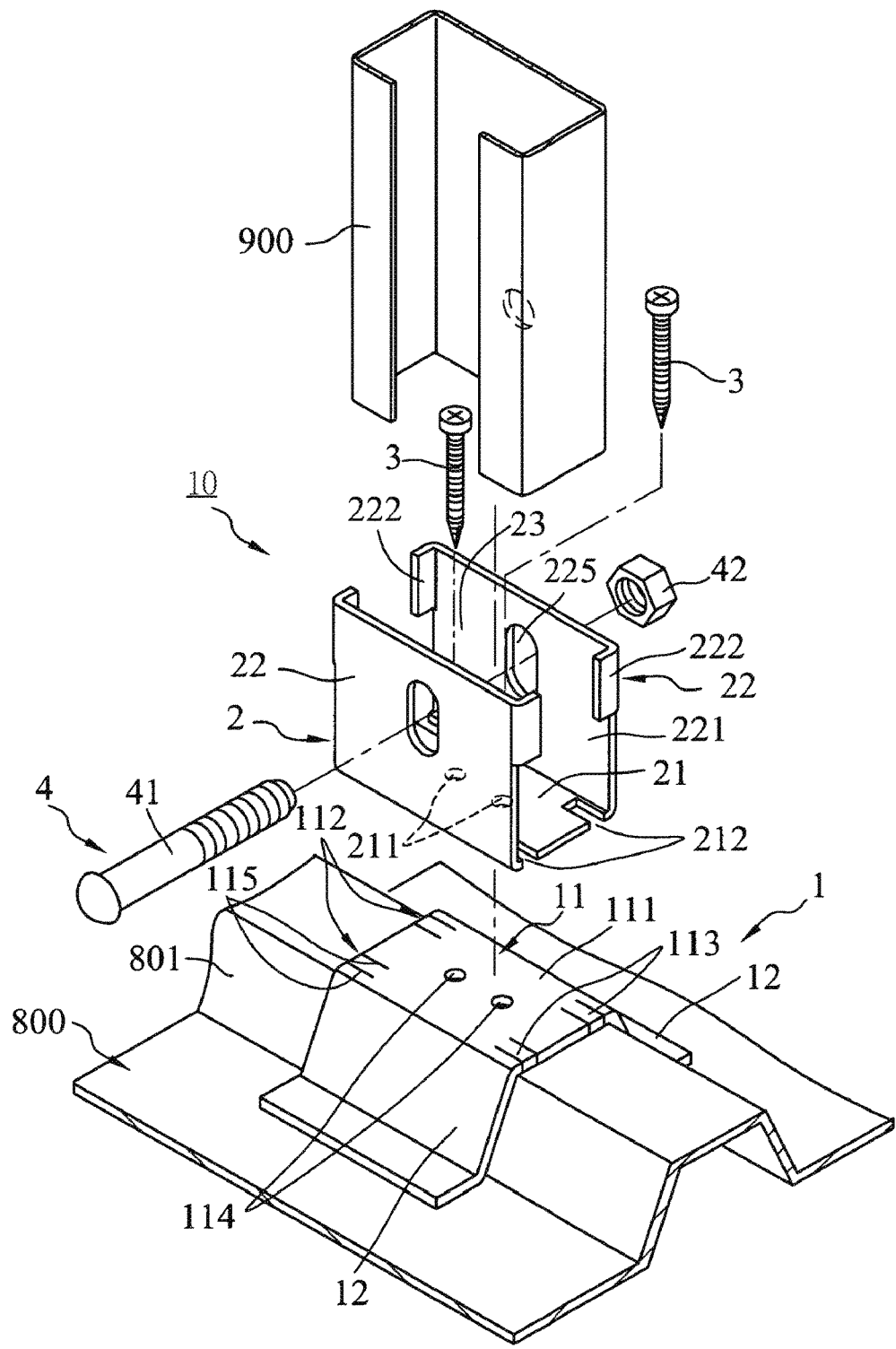
FIG. 1 is an exploded view of a positioning foot block in accordance with a first embodiment of the present invention, illustrating a status of retaining strips before bending.
Figure 2:
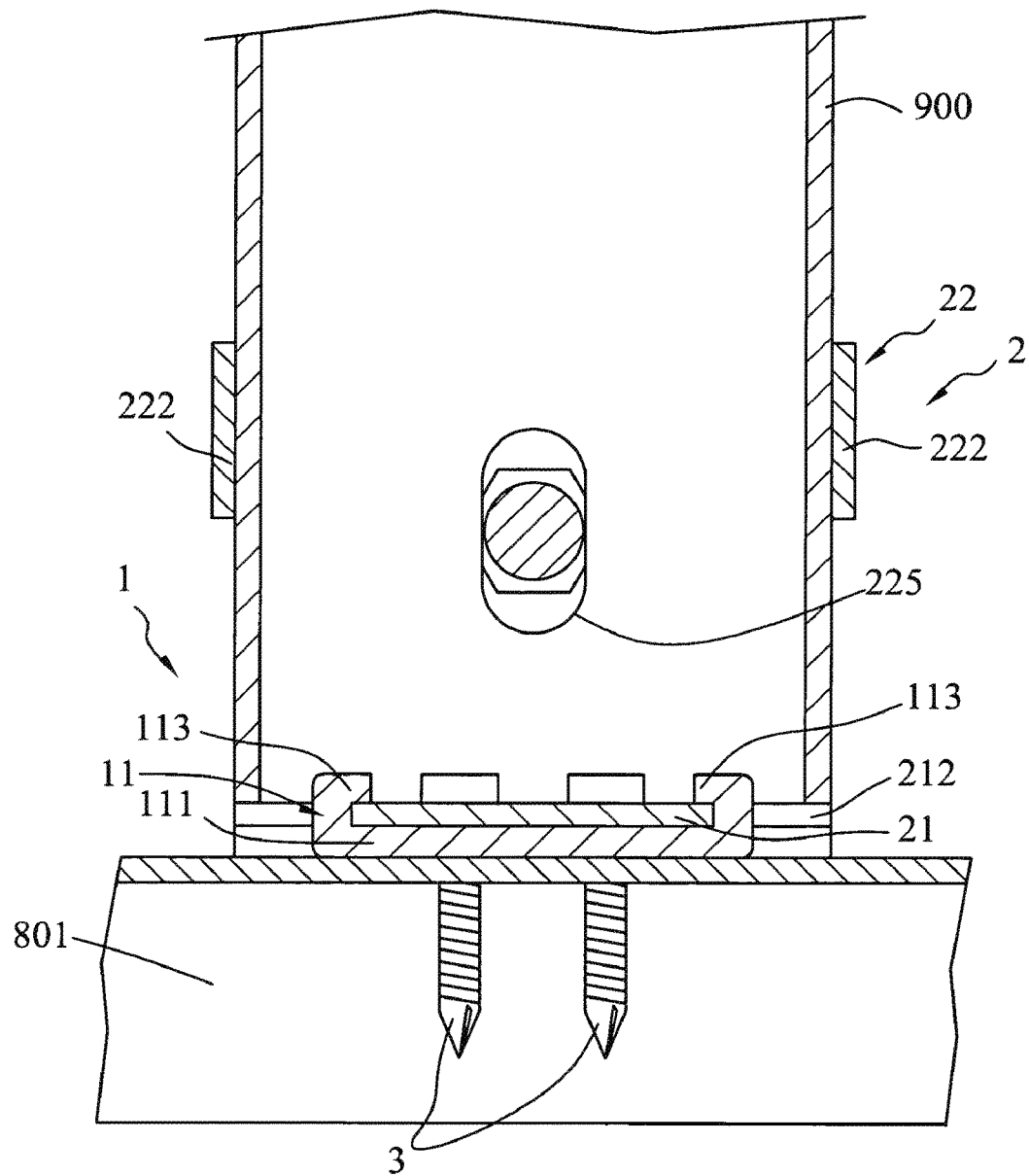
FIG. 2 is a longitudinal sectional view of the positioning foot block in accordance with the first embodiment of the present invention, illustrating retaining strips curved.
Figure 3:
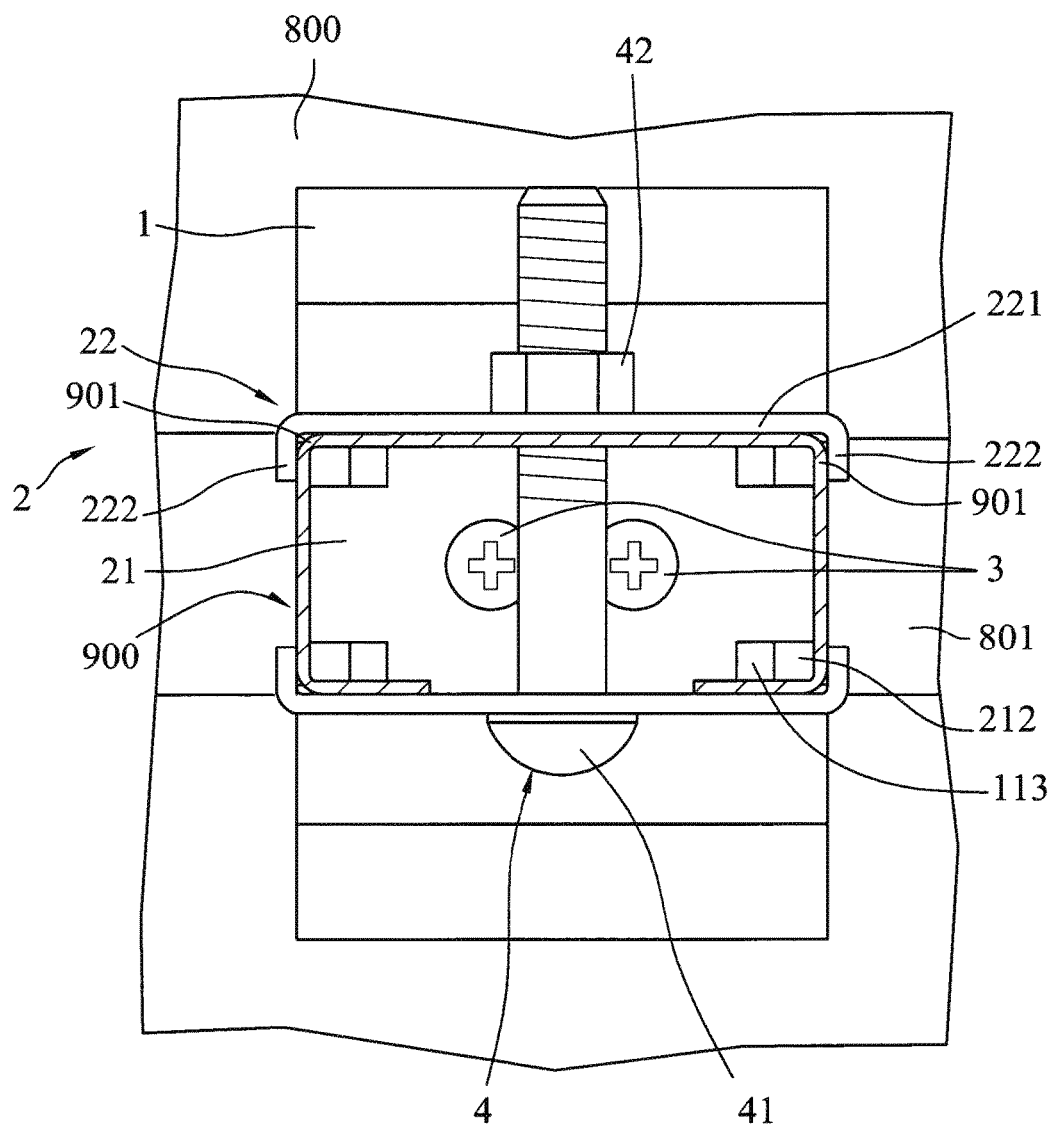
FIG. 3 is a transverse sectional view of the positioning foot block in accordance with the first embodiment of the present invention, illustrating retaining strips curved.

Referring to FIGS. 1-3, a positioning foot block 10 in accordance with a first embodiment of the present invention is shown. The positioning foot block 10 is mounted at one rib 801 of a corrugated sheet 800 for the mounting of an upright bar 900. The upright bar 900 has a substantially C-shaped cross section, defining four spaced corner ends 901. In this embodiment, the upright bar 900 is an extruded stainless steel bar. The positioning foot block 10 comprises a bottom mounting member 1, a support device 2, two bottom fastening members 3, and a lateral fastening member 4.

The bottom mounting member 1 comprises a bearing wall 11 supported on a top surface of the rib 801, and two bracing walls 12 respectively supported on opposing left and right sides of the rib 801. The bearing wall 11 comprises a substrate portion 111 supported on the top surface of the rib 801, two opposite slit pairs 112 respectively located on opposing left and right sides of the substrate portion 111, four retaining strips 113 respectively defined by the pairs of slits 112, and two bottom through holes 114 cut through opposing top and bottom surfaces of the substrate portion 111 and spaced from each other at a distance. Each slit pair 112 comprises two slits 115 cut into the left or right sides substrate portion 111, defining one respective retaining strip 113.

The bracing wall 12 are respectively and obliquely downwardly extended from opposing left and right sides of the bearing wall 11 and then extended horizontally outwardly in reversed directions.

The support device 2 comprises a bottom wall 21 horizontally affixed to a top surface of the bearing wall 11, two opposite side walls 22 respectively connected to opposing left and right sides of the bottom wall 21, and a positioning space 23 surrounded by the bottom wall 21 and the side walls 22 for the plugging of the upright bar 900. The bottom wall 21 has two top through holes 211 cut through opposing top and bottom surfaces thereof and disposed in communication between the bottom through holes 114 and the positioning space 23, and four retaining holes 212 arranged in two pairs and symmetrically located on opposing front and back sides thereof for the engagement of the respective retaining strips 113. Each side wall 22 comprises a main body portion 221 vertically upwardly extended from the bottom wall 21, two side lugs 222 respectively extended from opposing front and rear sides of the main body portion 221, and a through hole 225 cut through opposing left and right sides of the main body portion 221 in communication with the positioning space 23. Further, the two side lugs 222 are respectively perpendicularly extended from the opposing front and rear sides of the main body portion 221 and suspending in the positioning space 23 and also spaced above the bottom wall 21.

The bottom fastening members 3 are mounted in the positioning space 23 and respectively inserted through the respective top through holes 211 and the respective bottom through holes 114 and fixedly fastened to the rib 801 to affix the bottom mounting member 1 and the support device 2 to the corrugated sheet 800. In this embodiment, the bottom fastening members 3 can be self-tapping screws, screw nails or screw bolts. In this embodiment, two bottom fastening members 3 are used. However, one, three, four or more than four bottom fastening members 3 can be used to achieve the same effect.

The lateral fastening member 4 comprises one lateral screw 41 and one lateral screw nut 42. The lateral screw 41 is inserted, in direction from left to right, through the through hole 225 on the left side wall 22, the upright bar 900 and the through hole 225 on the right side wall 22. The lateral screw nut 42 is abutted against the right side wall 22 and fastened up with the lateral screw 41. The lateral screw 41 and the lateral screw nut 42 are fastened up to firmly secure the side walls 22 and the upright bar 900 together. Alternatively, the positioning foot block 10 can be configured to provide two, three or more than three lateral fastening members 4.

Figure 4:
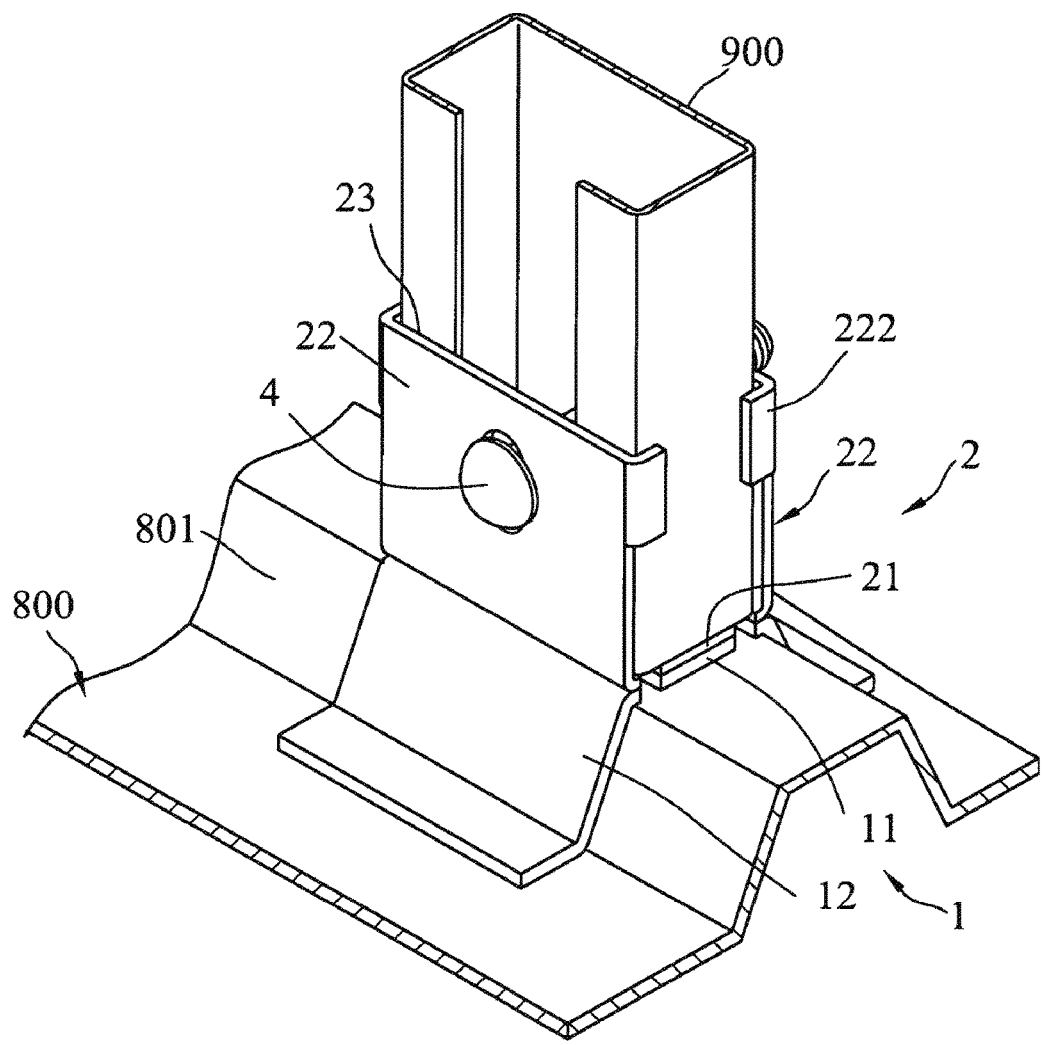
FIG. 4 is an oblique top elevational view of the positioning foot block in accordance with the first embodiment of the present invention, illustrating retaining strips curved.

Referring to FIGS. 2-4, in the installation of the positioning foot block 10, assemble the support device 2 and the bottom mounting member 1 together at first, i.e., curve the retaining strips 113 of the bottom mounting member 1 upwardly into engagement with the respective retaining holes 212 of the support device 2 to secure the support device 2 to the bottom mounting member 1. Thereafter, attach the bottom mounting member 1 to the corrugated sheet 800 at the selected location to keep the bearing wall 11 and the bracing walls 12 in abutment at the rib 801, and then thread the bottom fastening members 3 through the positioning space 23 into the support device 2, the bottom mounting member 1 and the rib 801 to affix the support device 2 and the bottom mounting member 1 to the corrugated sheet 800.

Thereafter, insert the upright bar 900 downwardly into the positioning space 23. At this time, the side walls 22 are respectively clamped on opposing left and right sides of the upright bar 900, and the side lugs 222 of the side walls 22 are respectively hooked on respective corner ends 901 of the upright bar 900 to secure the respective corner ends 901 of the upright bar 900 in position and to prohibit the upright bar 900 against vibration, holding down the upright bar 900 in the positioning space 23. At final, fasten the lateral fastening member 4 to the upright bar 900 and the support device 2, enabling the side walls 22 to clamp on the upright bar 900 tightly. In this embodiment, the through holes 225 are vertically extended elongated holes, facilitating the insertion of the lateral fastening member 4. However, this configuration design is not a limitation.

It's worth mentioning that the positioning foot block 10 can be configured without the bottom mounting member 1, allowing the support device 2 to be directly affixed to the corrugated sheet 800 by the bottom fastening member 3.

In view of the integrated the technical features of the positioning foot block 10 in accordance with the first embodiment of the present invention, the structural design of the side walls 22 of the support device 2 can firmly clamp the corner ends 901 of the upright bar 900 to protect the upright bar 900 against vibration enhancing supporting stability. Further, the configuration design of the bottom mounting member 1 widens its contact surface with the rib 801, enhancing the stability of the fastening of the positioning foot block 10 to the corrugated sheet 800.

Referring to FIGS. 5-9, a positioning foot block 20 in accordance with a second embodiment of the present invention is shown. This second embodiment is substantially similar to the aforesaid first embodiment with the exception of an added attachment 5 that is set between the upright bar 900 and the support device 2 and biasable relative to the support device 2.

The attachment 5 comprises an abutment wall 51 for abutment against the upright bar 900 in left-right direction, two side lugs 52 respectively extended from opposing front and rear sides of the abutment wall 51 toward the upright bar 900 and respectively clamped on opposing front and rear sides of the upright bar 900, and two inner lugs 53 respectively extended from opposing top and bottom sides of the abutment wall 51 toward the upright bar 900 and engaged into an opening 903 of the upright bar 900. The abutment wall 51 defines a first through hole 511 cut through opposing left and right sides thereof. The side lugs 52 are respectively perpendicularly extended from the opposing front and rear sides of the abutment wall 51 and disposed at two opposite lateral sides relative to a longitudinal center axis L. The inner lugs 53 are respectively extended from the opposing front and rear sides of the abutment wall 51 and spaced along the longitudinal center axis L. Each inner lug 53 defines two abutment edges 531 for abutment against two opposing lateral bar walls 902 of the upright bar 900 respectively. The abutment wall 51 in this second embodiment is a rectangular planar wall; the abutment wall 51, the inner lugs 53 and the side lug 52 are integrally made in one piece and bent into shape.

Figure 5:
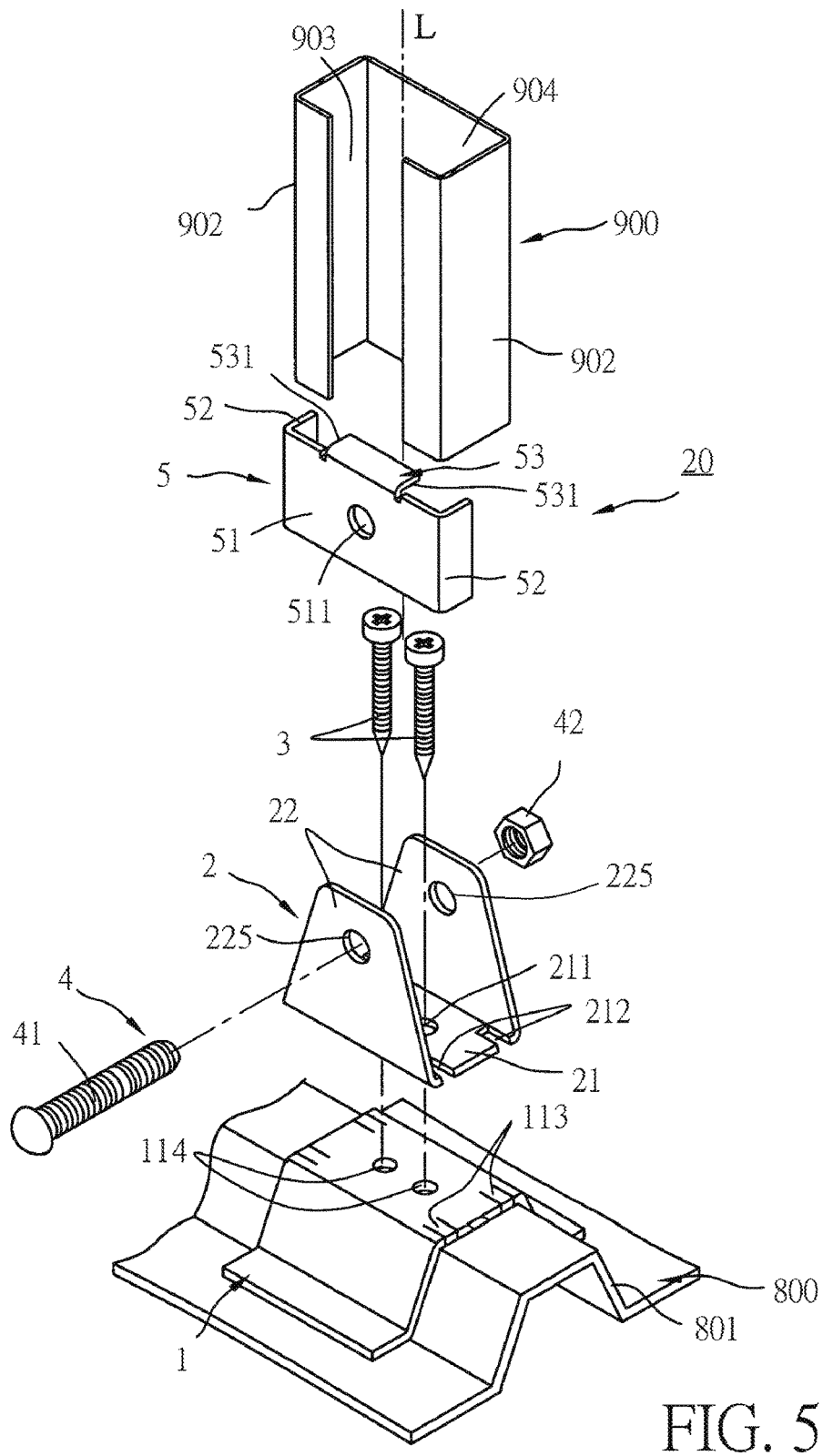
FIG. 5 is an exploded view of a positioning foot block in accordance with a second embodiment of the present invention, illustrating a status of retaining strips before bending.
Figure 6:
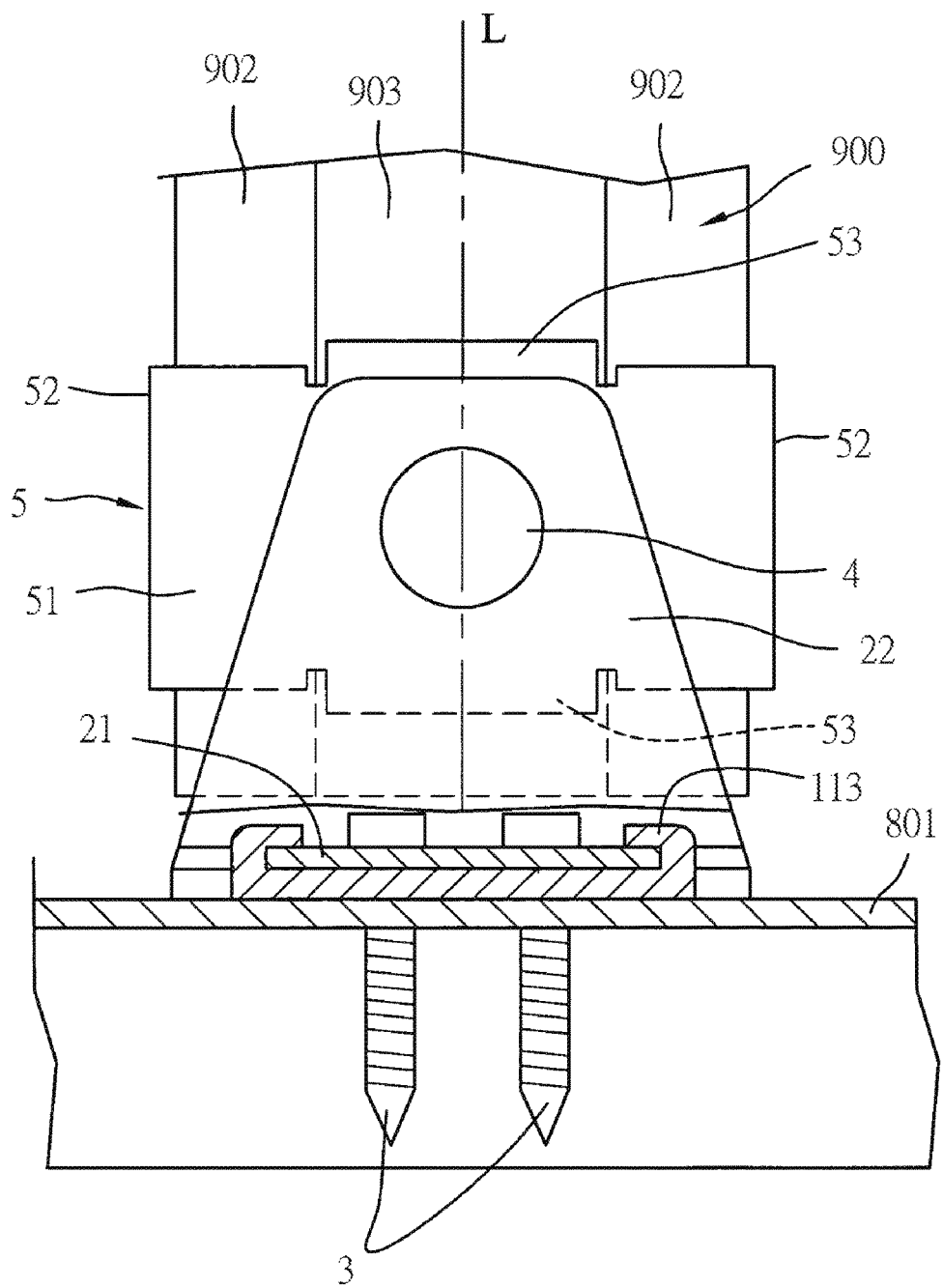
FIG. 6 is a side view of the positioning foot block in accordance with the second embodiment of the present invention with a cross section illustrating the support device fastened to the bottom mounting member.
Figure 7:
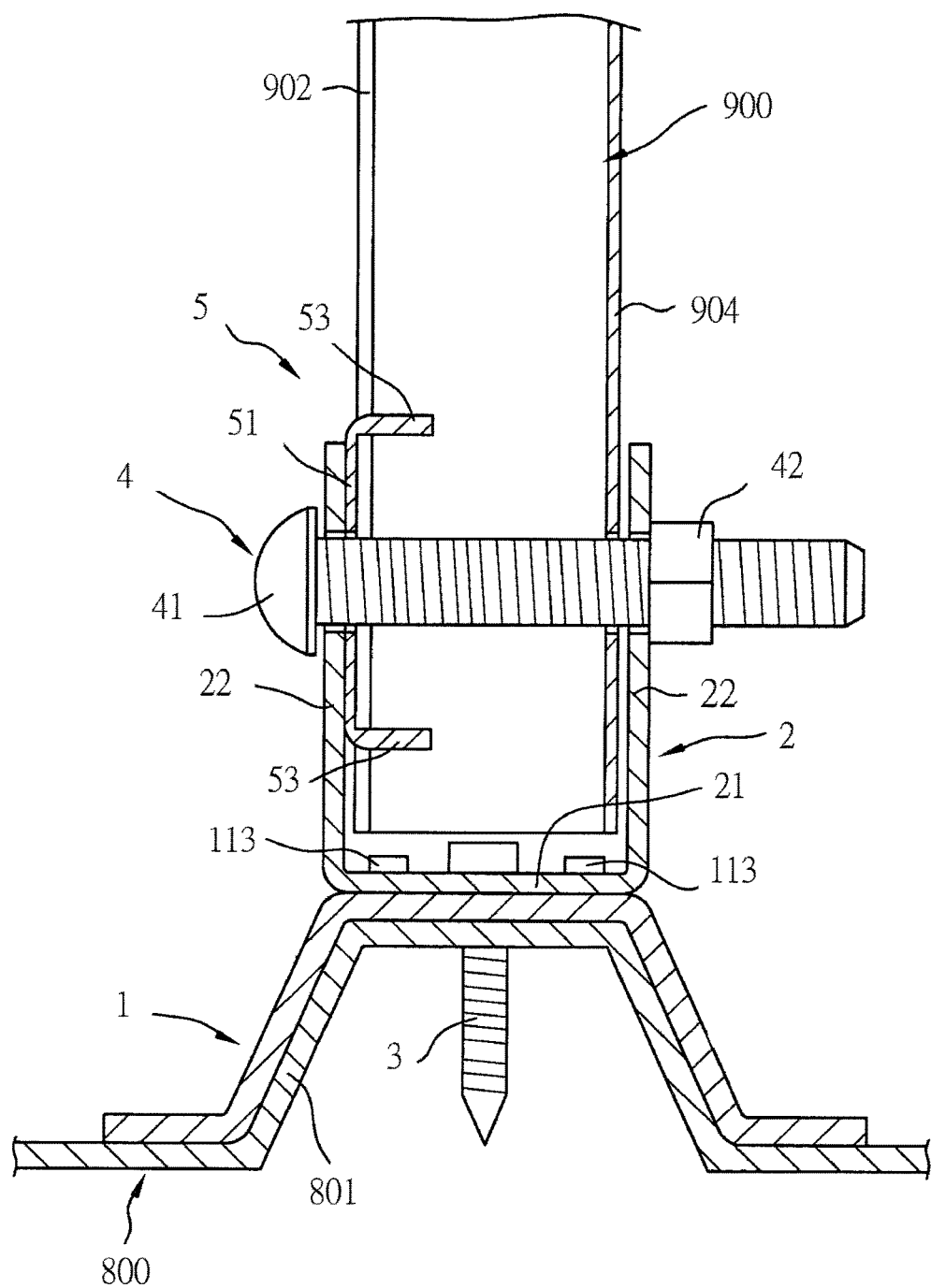
FIG. 7 is a longitudinal sectional view of the positioning foot block in accordance with the second embodiment of the present invention, illustrating the side walls in the loosened status.
Figure 8:
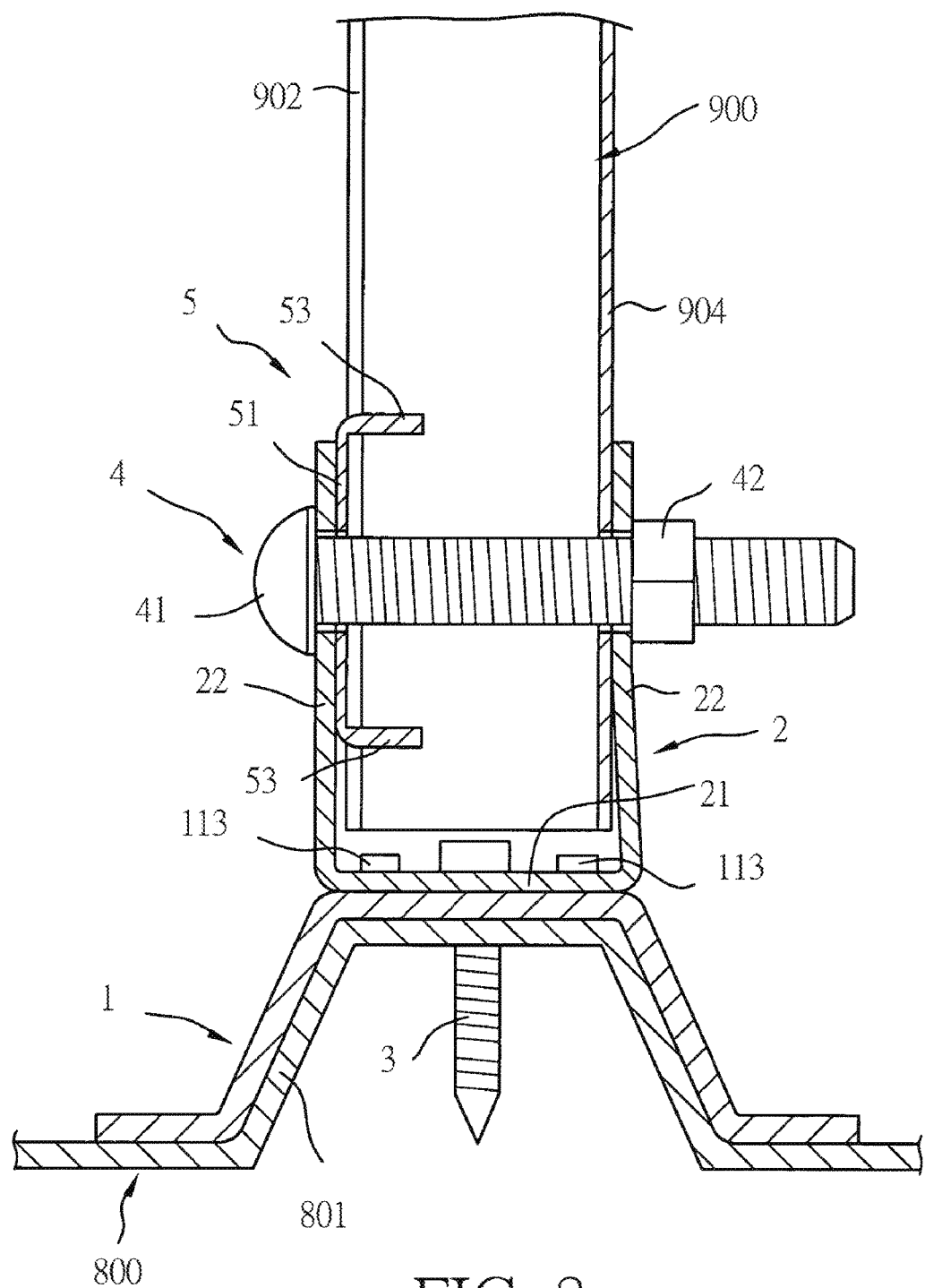
FIG. 8 is similar to FIG. 7, illustrating the side walls in the tightening up status.

The support device 2 comprises a bottom wall 21 disposed beneath the upright bar 900, two side walls 22 respectively and vertically upwardly extended from opposing left and right sides of the bottom wall 21. The bottom wall 21 is a horizontal planar wall, having two top through holes 211 (only one top through hole is shown in FIG. 5) cut through opposing top and bottom surfaces thereof and arranged in front-rear direction, and four retaining holes 212 arranged in two pairs and symmetrically located on opposing front and rear side edges thereof (only two retaining holes are shown in FIG. 5). Each side wall 22 has a second through hole 225 cut through opposing left and right sides thereof. The second through holes 225 of the side walls 22 are aimed at each other and spaced in left-right direction. One side wall 22 is abutted against the abutment wall 51 of the attachment 5. The other side wall 22 is abutted against the upright bar 900.

The lateral screw 41 of the lateral fastening member 4 is inserted in proper order in left-right direction through the second through hole 225 of the left side wall 22, the first through hole 511 of the abutment wall 51, a base bar wall 904 of the upright bar 900 and the second through hole 225 of the right side wall 22. The lateral screw nut 42 is abutted against the right side wall 22, and then fastened up with the lateral screw 41 to affix the support device 2, the attachment 5 and the upright bar 900 together.

Referring to FIGS. 5 and 6 again, the retaining strips 113 of the bottom mounting member 1 are bent upwards and engaged into the respective retaining holes 212 of the support device 2 to secure the support device 2 to the bottom mounting member 1. The bottom fastening members 3 are respectively downwardly inserted through the respective top through holes 211 of the support device 2 and the respective bottom through holes 114 of the bottom mounting member 1 and then threaded into the rib 801 to affix the support device 2 and the bottom mounting member 1 to the corrugated sheet 800.

Referring to FIGS. 7-9 again, the installation procedure of the positioning foot block 20 in accordance with the second embodiment of the present invention is substantially similar to the aforesaid first embodiment. The main features of this second embodiment are: the attachment 5 is abutted against the lateral bar wall 902 of the upright bar 900; the inner lugs 53 are engaged into the opening 903; the side lugs 52 are respectively clamped on the lateral bar walls 902 and the corner ends 901. The attachment 5 and the upright bar 900 are set between the side walls 22; the lateral fastening member 4 is horizontally fastened to the side walls 22, the abutment wall 51 and the upright bar 900. At this time, the side walls 22 can be fastened tight by the lateral fastening member 4 between a loosened status shown in FIG. 7 and a tightening up status shown in FIG. 8.

Figure 9:
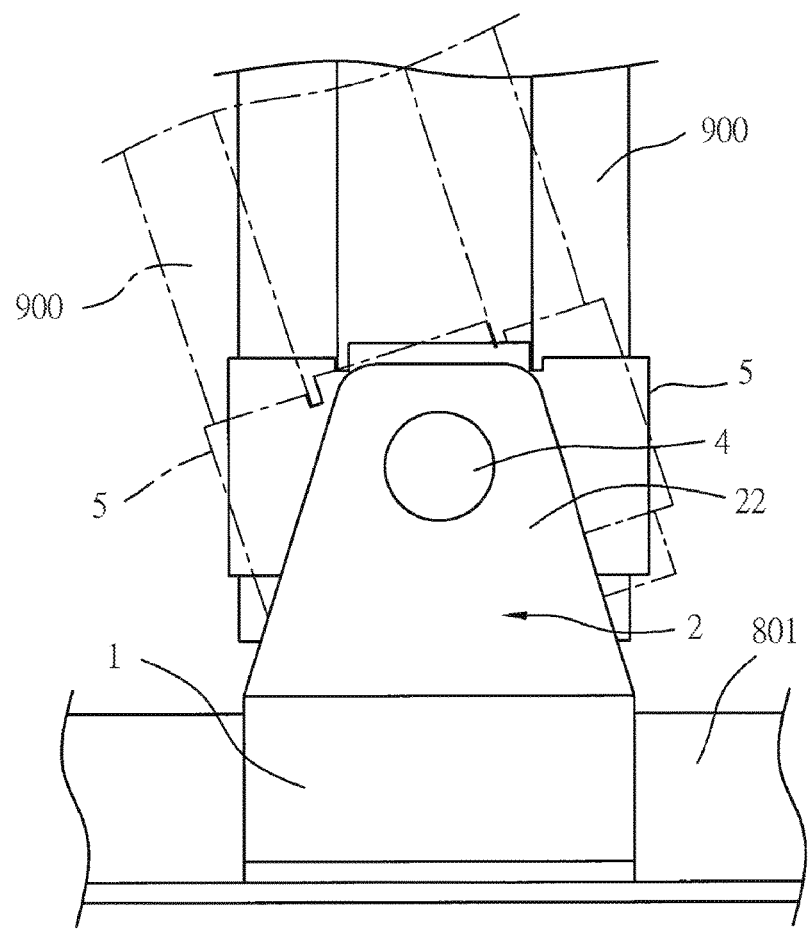
FIG. 9 is similar to FIG. 6, illustrating the attachment and the upright bar tilted.

When in the loosened status, the lateral screw 41 and the lateral screw nut 42 are respectively abutted against the side walls 22 in a loose manner, and the side walls 22 are loosely clamped on the abutment wall 51 and the upright bar 900 for allowing the user to adjust the tilt angle of the upright bar 900, for example, the imaginary line position shown in FIG. 9. After adjustment to the imaginary position, use a hand tool to fasten tight the lateral screw 41 and the lateral screw nut 42, locking the lateral screw 41 and the lateral screw nut 42 to the side walls 22 and also locking the side walls 22 to the abutment wall 51 and the upright bar 900, and thus the upright bar 900 is locked in position Attaching the attachment 5 to the support device 2 allows the side lugs 52 of the attachment 5 to clamp the corner ends 901 of the upright bar 900 and to further enhance the positioning stability of the upright bar 900 and prohibit the upright bar 900 against vibration, and also allows adjustment of the tilt angle of the upright bar 900 when the side walls 22 are in the loosened status. When the side walls 22 are in the tightening up status, the side walls 22 hold down the upright bar 900 firmly in position. Thus, this second embodiment facilitates quick installation and tilt angle adjustment of the upright bar 900, achieving the objects of the present invention.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A positioning foot block for holding an upright bar comprising a plurality of spaced corner ends in the cross section, the positioning foot block comprising a support device, said support device comprising a bottom wall, two side walls respectively extended from opposing left and right sides of said bottom wall and a positioning space surrounded by said bottom wall and said side walls for receiving said upright bar, wherein said support device further comprises an attachment, and said attachment comprises an abutment wall for abutment against said upright bar in left-right direction and two side lugs respectively extended from opposing front and rear sides of said abutment wall toward said upright bar and respectively clamped on opposing front and rear sides of said upright bar, and a lateral screw for fastening said attachment and said upright bar between said side walls in a biasable manner; said side walls are movable relative to said abutment wall between a loosened status where said side walls are loosely clamped on said abutment wall and said upright bar for allowing said upright bar to be turned about said lateral screw and a tightening up status where said side walls are tightly clamped on said abutment wall and said upright bar.

2. The positioning foot block as claimed in claim 1, wherein said bottom wall and said side walls are integrally made in one piece, each said side wall comprising a main body portion upwardly extended from said bottom wall, said side lugs being respectively perpendicularly extended from opposing front and rear sides of said main body portion toward said positioning space.

3. The positioning foot block as claimed in claim 1, further comprising a bottom mounting member, said bottom mounting member comprising a bearing wall mounted at a bottom side of said bottom wall and two bracing walls respectively and obliquely downwardly extended from opposing left and right sides of said bearing wall, said bearing wall being abutted against a top surface of a rib of a corrugated sheet, said bracing walls being abutted against opposing left and right sides of said rib.

4. The positioning foot block as claimed in claim 1, wherein said upright bar defines therein an opening; said attachment further comprises two inner lugs respectively extended from said abutment wall and engaged into said opening of said upright bar.

* * * * *